3,452,794
VEGETABLE TRIMMER
George H. Cooke, 18521 Prairie St., and William J. Carl, 8601 Oak Park Ave., both of Northridge, Calif. 91324
Filed Dec. 30, 1966, Ser. No. 606,131
Int. Cl. A01d *55/18, 23/04;* A01f *43/06*
U.S. Cl. 146—108                    10 Claims

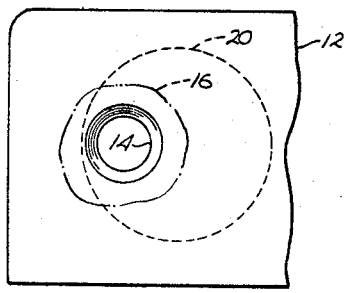
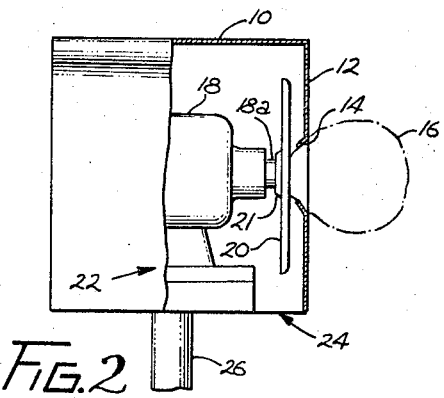
FIG. 1    FIG. 2
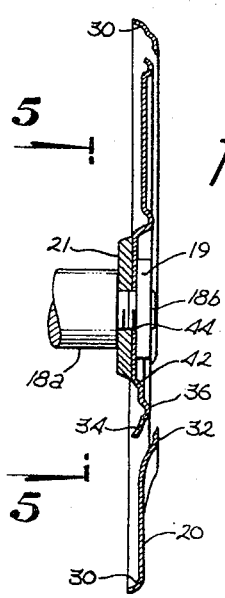
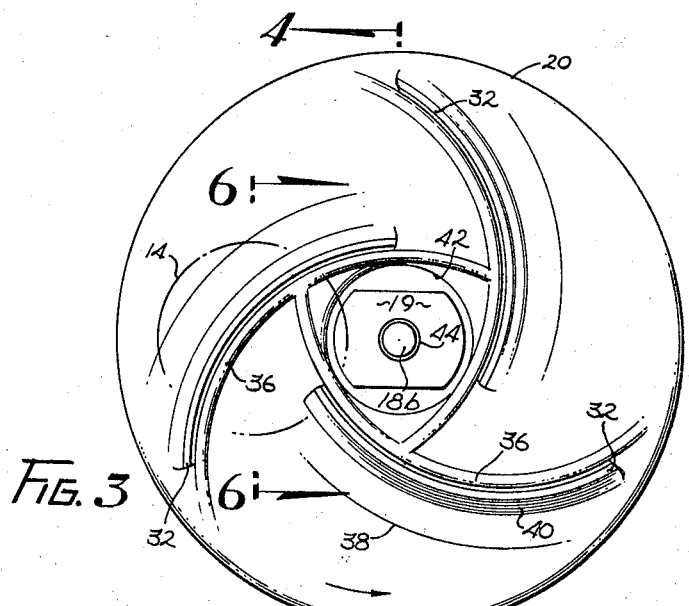
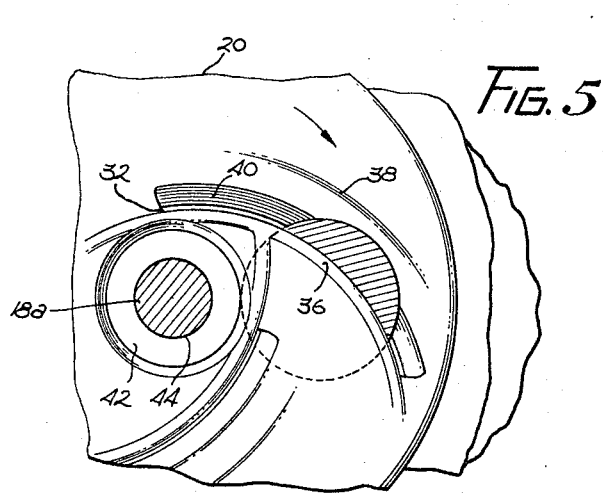
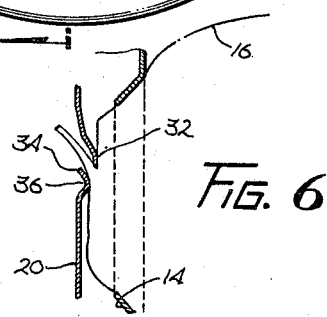
FIG. 4    FIG. 3    FIG. 5    FIG. 6
GEORGE H COOKE
WILLIAM J CARL
INVENTOR.
BY R. E. Geangue
ATTORNEY United States Patent Office 3,452,794
Patented July 1, 1969

ABSTRACT OF THE DISCLOSURE

The vegetable trimmer has a face cutter with a plurality of arcuately shaped blades, which are not concentric about the axis of rotation of the cutter face. The vegetable to be trimmed is placed against the cutter face and the center of curvature of the arcuately shaped blades are so spaced about the axis of rotation of the face cutter that the blades move inwardly and across the vegetable inserted into the device. A protective front panel covers the face cutter and contains an inwardly dished surface containing an opening for the end of the vegetable, which opening is located opposite the path of travel of the plurality of blades.

---

This invention relates to a vegetable trimmer for cutting off the butt ends of heads of lettuce, the stalk ends of ears of corn and the leafy ends of carrots, beets and the like. More particularly, the invention relates to an improved rotary face cutter for such a trimmer.

At present, trimming of fresh vegetables is performed at individual markets or groceries, which receive untrimmed vegetables from wholesalers or distributors. Market personnel trim the vegetables by hand with a knife to place them in condition for retail sale. Because of the volume of vegetables that must be trimmed every day (and hence the speed required) accidents often occur to the personnel doing the trimming. The present invention provides a power driven trimmer, which protects personnel to the maximum extent possible, while providing a device by means of which vegetable trimming can be done with extreme speed, safety, efficiency and minimal manual effort.

Various devices for accomplishing this result have been proposed heretofore, but the majority of them have utilized blades that provide a chopping action on the vegetable. This has resulted in clogging of the blades, and also inefficiency in that the blades are spaced apart and the action of one blade is completed well before the next blade engages the vegetable. Hereinafter, the term "chopping" will be used to describe the action of a cutter or a blade which engages a vegetable substantially normal to the longitudinal axis of the vegetable, while the term "slicing" will be used to describe the action of a cutter or blade that moves across the longitudinal axis of the vegetable with at least a partial slicing action, although there may be some chopping also present.

The device of the present invention comprises a housing containing power means for a rotary face cutter. A protective cover panel covers the face cutter and contains an inwardly dished surface having an opening for the butt end of a vegetable, which opening is located opposite the path of travel of a plurality of blades located on the face of the cutter. The dished surface adjacent the opening engages the vegetable being trimmed and prevents it from being pushed too far into the device against the face cutter. The bottom of the housing may be left open to permit the portions of the vegetables that have been cut off to drop out into a suitable receptacle.

One of the features of the present invention is that the face cutter comprises a plurality of arcuately-shaped blades, which are not concentric about the axis of rotation of the face cutter. The centers of curvature of the arcuately-shaped blades are so spaced about the axis of rotation of the face cutter that the blades move inwardly and across a vegetable inserted into the device. Preferably, the face cutter is stamped from a hard material, such as stainless steel, and the blades are then ground on the stamping. In addition, as will be explained hereinafter, various ribs are provided in the cutter to lend strength and stiffness to the cutter. These ribs, of course, are formed in the stamping process.

Further objects and advantages of the invention will become apparent from the following description, taken in conjunction with the accompanying drawings, in which:

FIGURE 1 is a front elevational view of a portion of the device of the invention in use;

FIGURE 2 is a side elevational view of the device shown in FIGURE 1 with a portion of the housing broken away to show internal structure;

FIGURE 3 is a plan view of a cutter blade embodying the invention;

FIGURE 4 is a sectional view taken on the lines 4—4 of FIGURE 3;

FIGURE 5 is a fragmentary view of a portion of the face cutter blade taken on the lines 5—5 of FIGURE 4; and FIGURE 6 is a fragmentary sectional view taken on the lines 6—6 of FIGURE 3.

FIGURES 1 and 2 illustrate a trimmer embodying the face cutter of the invention. As shown, the trimmer comprises a housing 10 having a front or face plate 12. The face plate 12 has a dished-access opening at 14 for receiving the butt end of a head of lettuce 16 or other vegetable that it is desired to trim. The sides of the surface adjacent the dished opening 14 engage the vegetable inserted through the opening and prevent its being inserted too far toward the face cutter located inside the housing.

Located inside the housing is conventional rotary power means, such as a motor 18, whose rotor shaft 18a is connected to and rotates a rotary face cutter 20. The rotor shaft 18a may be provided with a shoulder and have a stud 18b projecting therefrom (FIGURE 4) over which the face cutter is secured by means of a nut 19, which secures the cutter against a washer 21 that bears against the shoulder on the shaft 18a. Alternatively, the cutter may be secured to a sleeve that is keyed to the shaft 18a and held thereon by a set screw. The means for securing the cutter to the motor rotor shaft 18a are conventional and form no particular part of the present invention, except for the configuration of the face cutter 20, as will be hereinafter explained. As will be noted from FIGURES 1, 3 and 5, the access opening 14 is located off center from the axis of rotation of the face cutter 20, which axis, of course, is the rotational axis of the rotor of the motor 18. The motor 18 is conventionally mounted, as at 22, on the base of the housing 10, which is also open, as at 24, to allow those portions of the vegetables that have been cut off to drop downwardly. A suitable receptacle (not shown) may be provided below the housing 10 to receive such refuse. The housing 10, and its contained parts, is supported on a post 26 at a suitable distance above a structure on which the device rests. Of course, suitable movable or stationary supporting means (not shown) are provided, which are not part of the present invention.

FIGURES 3 through 6 illustrate the face cutter 20 in detail. As shown, the rotary face cutter 20 is substantially circular and planar and has its peripheral edge rolled, as at 30, to add stiffness to the cutter. Various other ribs are also formed in the cutter 20, as will be later explained in detail, to add strength to the cutter.

The cutter has formed therein a plurality of cutter blades 32, three in the present case although there may be any desired number, which are arcuately shaped with their centers of curvature offset from the rotational axis of the face cutter 20. Their centers of curvature are located substantially on a circle concentric with the rotational axis of the cutter, so that each blade 32 extends from near the periphery of the cutter toward and curves around its center. Thus, as the cutter rotates, the blades 32 exert a slicing action on a vegetable pressed against the blades through the opening 14. Of course, the cutter 20 rotates in a counterclockwise direction as seen in FIGURE 3 and in a clockwise direction as seen in FIGURE 5, so that the blades 32 perform a "scythe-like" action. It is pointed out that the blades overlap radially so that each blade picks up before the next prior blade disengages the article being cut, and the cutting action is continuous. Also, during rotation of the cutter, each blade completely covers the complete opening 14 as it passes the opening.

The face cutter 20 may conveniently be made of stainless steel, which, of course, is non-corrosive and may be used to cut virtually all vegetables without any corroding effect by the vegetables. The face cutter may conveniently be stamped and the blades 32 ground to sharpen them. The blades 32 are raised above the general plane of the cutter 20, as shown in FIGURES 4 and 6. The arcuate surface of the cutter 20 below the plane of the blades 32 is rolled, as at 34, to provide clearance and stiffness and to make it possible to sharpen the blades 32. In addition, an arcuate raised rib 36 having the same center of curvature as each blade 32 is provided adjacent the edge of each blade to add further stiffening to the face cutter.

As previously mentioned, each blade 32 is raised above the general plane of the face cutter 20. This is done in two steps. First, there is a minor arcuate break 38 having the same center of curvature as its corresponding blade 32, and inwardly thereof there is a similarly centered rib 40.

The center of the face cutter 20 has a circularly-shaped depression 42 formed in its center concentric with the axis of rotation of the cutter with an opening 44 in its center that fits the stud 18b on the rotor 18a. The depression 42 provides stiffening for the cutter and also insures that the means that retain the cutter on the rotor 18a remain below and clear of the blades 32.

It is pointed out that the breaks 38 and ribs 40 stiffen the blades 32. Furthermore, it is pointed out that the blades 32 are ground flat and have no rake, which would cause the blades to drag in material much in the manner of a screw.

Although one embodiment of the invention has been shown and described, it is apparent that many changes and modifications may be made therein by one skilled in the art without departing from the true spirit and scope of the invention.

What is claimed is:
1. A trimmer for a food product comprising:
   a rotary face cutter formed substantially in a plane and having an axis of rotation;
   a plurality of cutter blades formed in said face cutter displaced from said plane and extending generally outwardly from said axis of rotation to have inner and outer cutting portions;
   said cutter blades being substantially arcuate in shape and having centers of curature that are offset from said axis of rotation;
   means for positioning said product to be trimmed against said cutter at a location offset from said axis of rotation; and
   means for rotating said cutter in a direction such that the inner portion of each blade is the last to trim said product.

2. A trimmer as defined in claim 1 wherein said blades overlap radially; said positioning means locating said product so that prior to the disengagement of said inner blade portion of one blade from said product, the outer portion of the next blade engages the product, thereby resulting in a continuous cutting action.

3. A trimmer as defined in claim 2 wherein said centers of curvature lie substantially on a circle concentric with said axis of rotation.

4. A trimmer as defined in claim 2 wherein said positioning means comprises a face plate located in front of said face cutter, and an opening in said face plate of receiving and positioning said product against said face cutter, said opening being located off center from the axis of rotation of said face cutter and being of such size as to be completely covered by each blade as it passes the said opening.

5. The combination set forth in claim 2, further including a plurality of arcuate ribs equal in number to said plurality of cutter blades with one rib being located adjacent each said cutter blade and closer to said axis of rotation than said blade, the center of curvature of each said rib being substantially the same as that of said blade adjacent which said rib is located.

6. The combination set forth in claim 2, further including a plurality of arcuate ribs equal in number to said plurality of cutter blades with one rib being located adjacent each said cutter blade and farther from said axis of rotation than said blade, the center of curvature of each said rib being substantially the same as that of said blade adjacent which said rib is located.

7. The combination set forth in claim 2, further including a plurality of pairs of arcuate ribs, said plurality of pairs of ribs being equal in number to said plurality of cutter blades, one pair of said ribs being located adjacent each said cutter blade with one rib closer to said axis and another rib farther from said axis than said cutter blade, the centers of curvature of each of said pairs of ribs being substantially the same as that of said blade adjacent which said pair of ribs is located.

8. The combination set forth in claim 7, further including a circularly-shaped depression concentric with said axis.

9. The combination set forth in claim 7, wherein said face cutter has a rolled peripheral edge.

10. The combination set forth in claim 8, wherein said face cutter has a rolled peripheral edge.

References Cited
UNITED STATES PATENTS

| | | | |
|---|---|---|---|
| 338,306 | 3/1886 | Seegmueller | 146—124 |
| 1,281,964 | 10/1918 | Hawes et al. | 146—114 |
| 2,590,987 | 4/1952 | Magnuson | 146—124 X |
| 2,844,176 | 7/1958 | Barrows et al. | 146—124 X |

W. GRAYDON ABERCROMBIE, *Primary Examiner.*